Jan. 5, 1943.　　　　W. C. RUDD　　　　2,307,304
FLOW CONTROLLED SWITCH
Filed May 15, 1942　　　　2 Sheets-Sheet 1
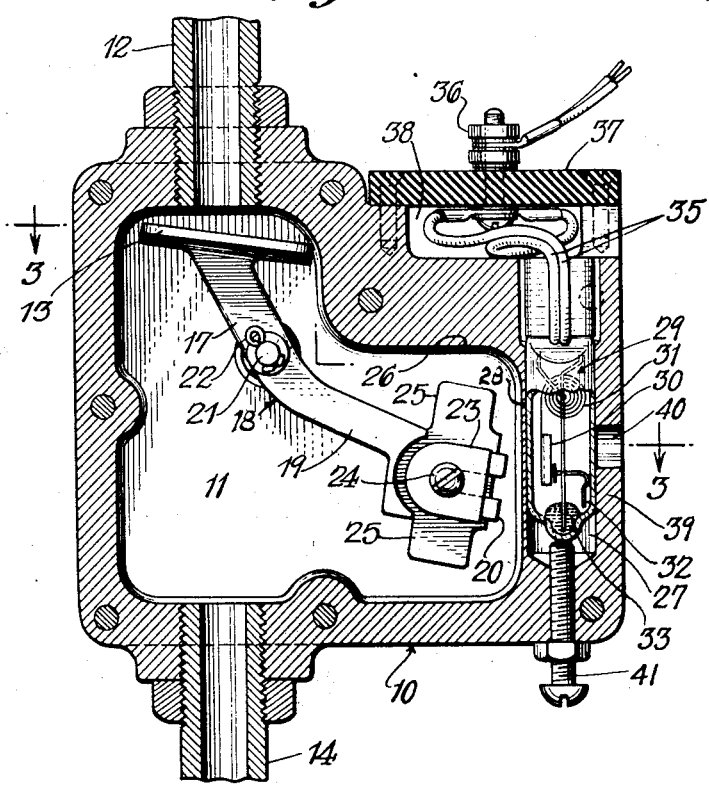
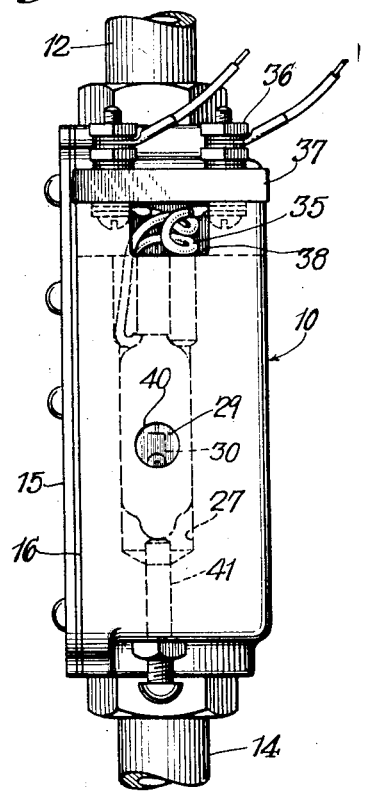
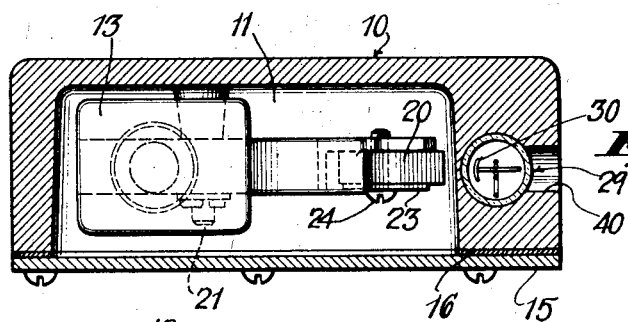
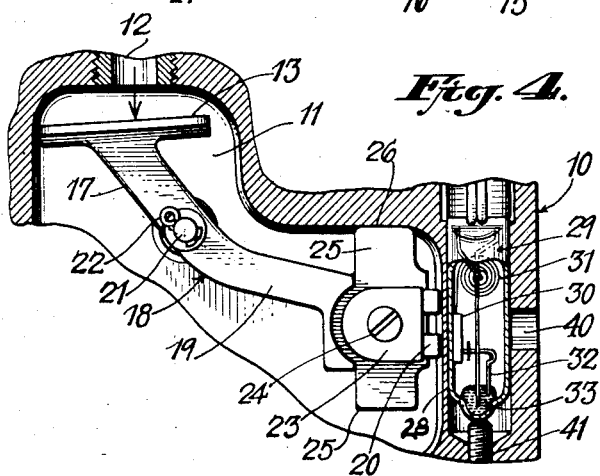
INVENTOR.
WALLACE C RUDD.
BY
Ward Crosby & Neal
ATTORNEYS

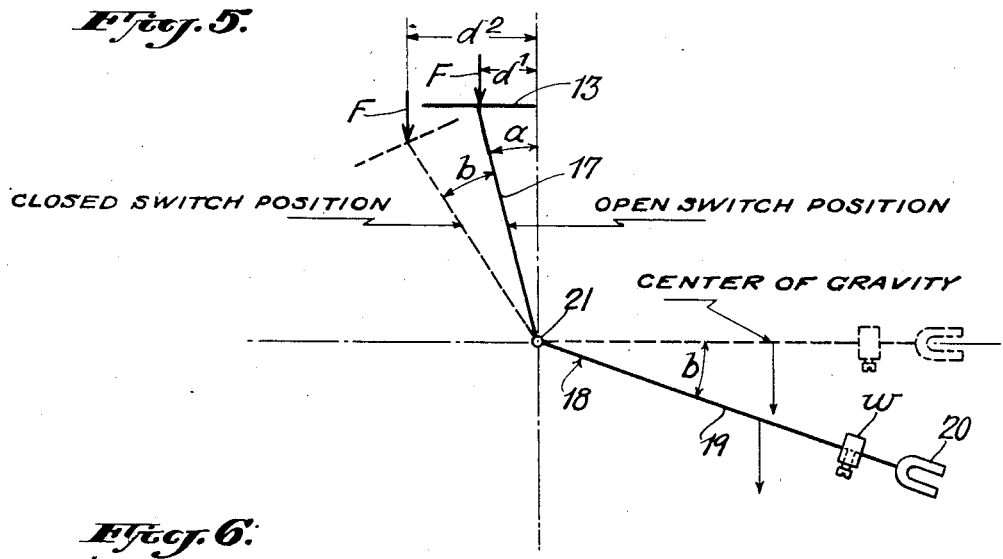
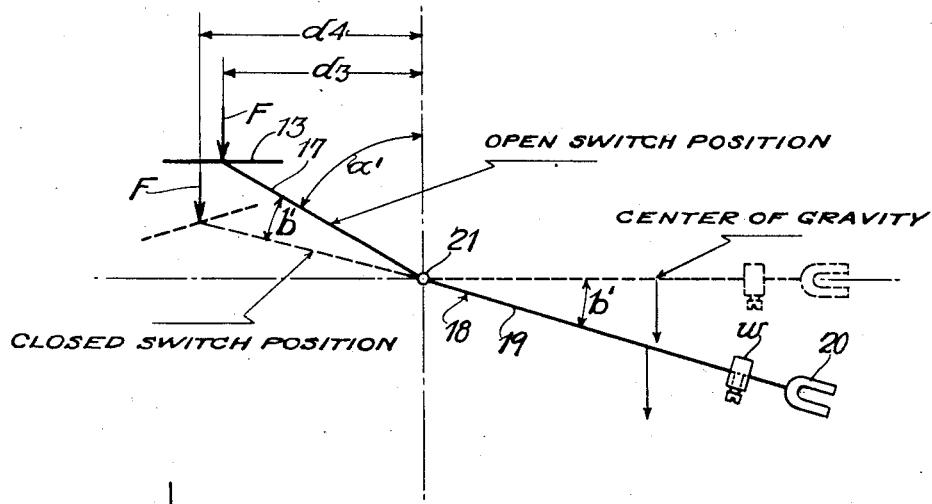
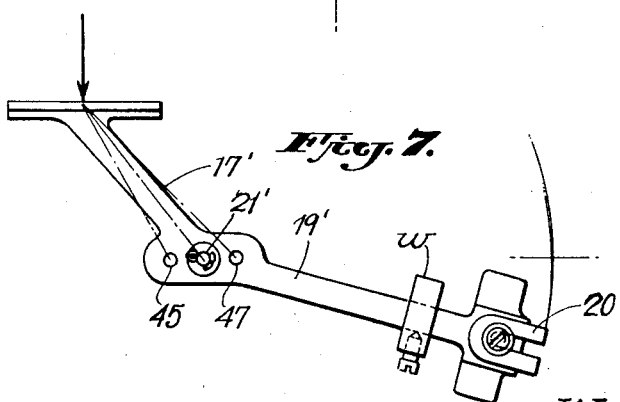
INVENTOR.
WALLACE C. RUDD.
BY Ward, Crosby & Neal
ATTORNEYS Patented Jan. 5, 1943

2,307,304

UNITED STATES PATENT OFFICE 2,307,304

FLOW CONTROLLED SWITCH

Wallace C. Rudd, Yonkers, N. Y., assignor to Induction Heating Corporation, New York, N. Y., a corporation of New York Application May 15, 1942, Serial No. 443,058

5 Claims. (Cl. 200—81)

This invention relates to flow controlled switch apparatus.

The objects of the invention include the provision of a durable and highly dependable means for opening or closing an electrical circuit responsive to the force of a stream of fluid. The preferred forms of the invention embody arrangements with which, once the switch is operated by the force of the stream, the parts will be maintained in the same operative condition regardless of minor variations in the force of the stream, but upon reduction of such force to less than a predetermined value, the switch will be operated in the opposite direction with certainty. Preferred embodiments of the invention also embody switch means which will normally be biased to open circuit condition, combined with flow controlled means for operating the switch, which is also biased in a direction to normally leave the switch in open circuit condition, thus insuring an open circuit condition with a high degree of reliability whenever the controlling stream is flowing with less than a predetermined force or fails to flow in excess of a predetermined rate.

The invention is particularly adapted among numerous other possible uses, to control the electrical power supply to large vacuum tubes of types requiring a constantly maintained supply of cooling fluid to prevent the destruction of the tubes. That is, the invention may be used to promptly cut off such power supply automatically whenever the flow of cooling fluid is interrupted or reduced to less than a predetermined required amount. Yet the apparatus is such that minor variations in the pressure of the cooling fluid supply, such for example as may be caused by opening various water taps on a water supply system, will not result in cutting off the power supply.

Various further and more specific objects, features and advantages of the invention will appear from the detailed description given below taken in connection with the accompanying drawings which form a part of this specification and illustrate merely by way of example, preferred forms of the invention. The invention consists in such novel features and combinations of parts as may be shown and described in connection with the apparatus herein disclosed.

In the drawings Fig. 1 is an elevational view partly in section showing one embodiment of the invention;

Fig. 2 is a view taken at right angles to the view of Fig. 1;

Fig. 3 is a sectional view taken substantially along line 3—3 of Fig. 1;

Fig. 4 is a view of the operating parts when in closed switch positions;

Figs. 5 and 6 are schematic diagrams for illustrating certain operating principles of the invention; and Fig. 7 is a view of a modified form of flow controlled element which may be used in conjunction with apparatus like or similar to that shown in Fig. 1.

Referring now more specifically to Figs. 1-4, a container 10 which may be formed of cast brass for example, or some other suitable non-magnetic material, is shaped to provide a compartment 11 into which a controlling stream of fluid may flow as through an inlet pipe 12, the stream as it enters the compartment being directed against a vane 13. The fluid upon passing around the vane fills the compartment, and the stream may pass out through an outlet pipe as at 14. Access may be had to the compartment 11 on taking off a cover plate as at 15, which may be secured in place by screws as shown and sealed in respect to the body portion of the container 10 as by a gasket 16.

With the preferred form of the invention, the vane 13 may be mounted as shown in a position to extend transversely of the stream, on an arm 17 of a bell crank member 18, having another arm 19 carrying a small powerful permanent magnet as at 20 of the horseshoe type. The bell crank member may be removably mounted upon a pivoting pin as at 21, this pin being fixed in the rear wall of the container and the member 18 being retained thereon as by a washer and cotter pin at 22.

The permanent magnet 20 which is made for example of an alloy available under the trade name of "Alnico," may be removably secured to the arm 19 as by a small clamping plate 23 and screw 24. The end of the arm 19 may be formed with portions 25 having suitable weight, joined by a flat area as shown against which the magnet is clamped. The upper portion 25 as shown in Fig. 4 may also serve as a stop means engaging an upper wall portion 26 of the cavity 11 when the bell crank member is swung to bring the magnet into its desired switch operating position.

The container 10 may be formed with another compartment or cavity 27 of cylindrical shape separated from the compartment 11 by a relatively thin non-magnetic wall portion 28. This cavity is adapted to slidably receive an hermetically sealed glass enclosed mercury switch assembly as at 29 of a type known per se, adapted to close a circuit responsive to magnetic flux applied to an armature as at 30. This armature may be supported in the switch enclosure as by a spirally coiled spring member 31 so that a contact member 32 carried by the armature 30 is normally held out of contact with a globule of mercury 33 lodged in the lower end or tip of the glass switch container. The mercury switch may be slid down longitudinally into the cavity 27. Connections as at 35 for the switch may be brought out to binding posts as at 36 supported on an insulation piece 37 secured by screws as shown to the outside wall of the container 10. Preferably the outside wall is so shaped at this area as to provide a cavity as at 38 for receiving the excess length of the connections 35. The outer wall 39 of cavity 27 may be formed with an aperture 40 through which one may view the operating parts of the switch and thereby determine when the switch has been slid into the proper position with respect to magnet 20. An adjusting screw 41 may be brought in through the lower end wall of the cavity 27 for varying the limit to which the mercury switch may be slid down into the cavity 27. This cavity may be of a size to frictionally engage the glass walls of the switch enclosure against accidental upward movement, once its position is adjusted.

With the operating parts in the positions as shown in Fig. 1, the bell crank member 18 by reason of its weighted arm 19, is biased to a position such that the magnet 20 is spaced a substantial distance from the thin wall portion 28 which separates the magnet from the mercury switch. If now a stream of fluid is introduced through the inlet 12, as soon as such stream strikes against the vane 13 with a force in excess of a predetermined amount, the parts will be moved to the relative positions shown in Fig. 4. That is, the vane 13 will be moved from its former position as tilted downwardly slightly to the right, to the position shown in Fig. 4, where it has a slight downward tilt to the left. This will cause the bell crank arm 19 to be moved through a small angle counter-clockwise, sufficient to bring the magnet 20 up against, or in close proximity to, the thin wall portion 28 which separates the two compartments 11 and 27. Thereupon, the armature 30 in the mercury switch will cause the contact 32 to dip into the mercury globule 33 and close the circuit. The magnet and other parts will be maintained in the circuit closing positions as shown in Fig. 4, so long as the controlling stream of fluid entering inlet 12 continues to apply sufficient force to hold the vane 13 against being restored by the weighted arm 19. But when such force is reduced below a predetermined value, the magnet 20 as carried by the arm 19, will be free to drop back to the position shown in Fig. 1, whereupon the parts in the mercury switch will be restored to open circuit positions as shown in Fig. 1.

In case the controlling stream of fluid for example is obtained from an ordinary water distributing system, the pressure in the system, and consequently the force of the stream on the vane 13, may fluctuate considerably whenever various water taps on the system are opened and closed and for other reasons. Consequently, the apparatus above described has been devised to insure maintaining the magnet in switch operating position, notwithstanding variations in the water pressure within normal predetermined limits. The manner in which this is accomplished will now be explained in connection with Fig. 5 wherein the vane, magnet and supporting parts are schematically indicated, and identified by the same reference characters as used in Fig. 1.

The torque produced in the member 18 is a function of the magnitude of the force F of the stream and the effective radius at which it acts. It will be noted that the arm 17 in effect extends from the center of application of the force of the stream on vane 13 to the pivot point 21, at an angle to the direction of the stream, which angle is indicated at $a$ and is very substantially less than a right angle. With this arrangement the force of the stream F initially acts against the vane 13 with a leverage or effective radius represented by the distance $d_1$. Then as the vane is moved by the stream, toward the left and downwardly, through an angle $b$, the force F will remain nearly constant (assuming the stream remains nearly constant), but the leverage is gradually increased until, when the vane and magnet are in their closed circuit positions, the force will be acting about the pivot point with a leverage or effective radius represented by the distance $d_2$. As indicated in Fig. 5 the center of gravity of the moving parts will, meanwhile, not be shifted very materially in horizontal directions. Consequently once the stream has forced the vane and magnet to the switch operating positions shown by the dotted lines in Fig. 5, the bias afforded by the weighted arm 19 and magnet will be insufficient to cause the magnet to drop back to open circuit position until the force of the stream has diminished considerably, as compared with the force initially required to operate the device.

The force initially required to operate the device will of course depend upon the weight of the magnet and the relative weights of the arms 17, 19 and any weight such as at $w$ carried by or forming a part of the arms.

The amount by which the force of the stream F, after operating the device, has to be reduced before the magnet 20 will drop out of switch operating position, may be varied by changing the effective angle of the arm 17 with respect to the direction of the stream. For example, if as shown in Fig. 6, such angle is increased as indicated at $a'$, then the force F will act at an effective radius $d_3$ when the parts are in open switch position, and with an effective radius $d_4$ when the parts are in closed switch position, and the difference between $d_3$ and $d_4$ will be considerably less than the difference between distances $d_1$ and $d_2$ of Fig. 5. In other words, if said angular position of the vane supporting arm is increased, then the device with the parts in their switch operating positions, will be more sensitive to small changes in the force of the stream. On the other hand, if the angle $a$ is decreased, then the device will be less sensitive to minor fluctuations in the force of the stream, i. e., the difference between the force required for opening and the force required for closing the switch will be greater.

In many cases, it will be advisable to design the device to open and close the switch, responsive to fixed predetermined forces, and without providing any means for easy adjustment of the switch opening and closing conditions. This will avoid danger of tampering with the device and attempted adjustments by unskilled persons. On the other hand, in some circumstances it may be desirable to so construct the device that it may be adjusted to open the switch at various different rates of flow, and also so that it will operate to close the switch again when the flow is diminished by a desired percentage which the user may want to change from time to time, or to meet altered conditions of use of the device. For this purpose the bell crank member for supporting the magnet and vane may for example be constructed in the form shown in Fig. 7 wherein the position of the weight $w$ may be adjusted along the arm 19' and the effective angular position of the arm 17' may be adjusted by placing the pivoting pin 21' in any one of several different apertures as at 45—47. Other parts of the apparatus not shown in Fig. 7 may remain the same as in Fig. 1, except that the rear wall of the container 10 will of course be made with separate holes properly spaced to receive the pivoting pin 21' when placed in any one of the apertures 45—47. With the construction of Fig. 7, if it is desired to have the switch initially operate only with a more forceful stream, then the weight $w$ is moved outwardly along arm 19'. Conversely, if the initial operating force is to be less, then the weight $w$ is adjusted to a position closer to the pivoting pin 21'. If it is desired to have a relatively wide difference between the force which will initially operate the device, and the force which will permit restoration of the switch, then the pin 21' is placed in aperture 45. If this desired difference is to be substantially less, then the pin is placed in aperture 47. As shown in Fig. 7, the pin is placed in an intermediate aperture providing an intermediate adjustment.

While the invention has been described in detail with respect to particular preferred examples, it will be understood by those skilled in the art after understanding the invention that various changes and modifications may be made without departing from the spirit and scope of the invention, and it is intended therefore in the appended claims to cover all such changes and modifications.

What is claimed as new and desired to be secured by Letters Patent is:

1. Flow controlled switch apparatus comprising a compartment into and through which a downwardly directed controlling stream of fluid may flow, magnetically responsive switch means adjacent to, but outside said compartment, a member pivoted within said compartment on a generally horizontal axis close to the path of said stream, said member having two divergent arms, a magnet for actuating said switch means mounted on one of said arms, and a vane mounted in the path of said stream on the other of said arms, the weight of said member and parts carried thereby being so disposed with respect to said axis that in the absence of the stream, the member is biased by weight in a position with said magnet below its switch actuating position, and upon pivotal movement of the member under the force of the stream on the vane, the magnet is elevated into switch actuating position, said vane being mounted sufficiently upstream from said axis whereby the radius about said axis, at which the stream acts on the vane, substantially increases as the magnet comes into such actuating position.

2. Flow controlled switch apparatus comprising a compartment into and through which a controlling stream of fluid may flow, magnetically responsive switch means adjacent to, but outside said compartment, a member pivoted within said compartment on a generally horizontal axis, said member having two divergent arms, a magnet for actuating said switch means mounted on one of said arms, and a vane mounted in the path of said stream on the other of said arms, the weight of said member and parts carried thereby being so disposed with respect to said axis that in the absence of the stream, the member is biased by weight in a position with said magnet below its switch actuating position, and upon pivotal movement of the member under the force of the stream on the vane, the magnet is elevated into switch actuating position.

3. Flow controlled switch apparatus comprising an enclosure through which a controlling stream of fluid may flow, a pivotally mounted supporting member therein, a vane mounted on said member in a position to be engaged by the flow, and means mounted on said member for actuating a switch upon arcuate movement of the vane and supporting member about the pivotal axis of said member, responsive to changes in the force of said stream as applied to said vane, said vane being normally so positioned with respect to the stream and said axis, that the moment of force of the stream as applied to the vane, substantially increases as said switch actuating means comes into switch actuating position.

4. Flow controlled switch apparatus comprising an enclosure through which a controlling stream of fluid may flow, a pivotally mounted supporting member therein, a vane mounted on said member in a position to be engaged by the flow, and means mounted on said member for actuating a switch upon arcuate movement of the vane and supporting member about the pivotal axis of said member, responsive to changes in the force of said stream as applied to said vane, the assembly comprising said supporting member and associated parts including means biasing the member in a direction tending to move the vane against direction of flow of the stream, said vane being normally so positioned with respect to the stream and said axis, that the difference between the moment of force of the stream as applied to the vane and the effective biasing moment of force, will substantially increase upon substantial movement of the vane along the direction of the stream from its normal inactive position, thereby tending to prevent the biasing force from causing restoring movemnt of the vane upon minor reductions in the force of the stream.

5. Flow controlled switch apparatus comprising a compartment through which a controlling stream of fluid may flow, magnetically responsive switch means adjacent to, but outside said compartment, a bell crank member mounted in said compartment, a switch operating magnet mounted on one arm of said member, a vane mounted on the other arm of said member to extend into said stream for controlling the position of said magnet responsive to the force of the stream, and means for effectively adjusting the angular relationship of said other arm with respect to the direction of flow of the stream, to thereby effectively vary the leverage of the force of the stream on the vane and to vary the difference between such leverage as applied before and after movement of the vane responsive to said force.

WALLACE C. RUDD.